(12) United States Patent
Hu et al.

(10) Patent No.: US 9,154,221 B2
(45) Date of Patent: Oct. 6, 2015

(54) METHOD, SYSTEM, AND RELAY APPARATUS FOR REALIZING PASSIVE OPTICAL NETWORK REACH EXTENSION

(71) Applicants: Xing Hu, Shenzhen (CN); Hongli Jiang, Chengdu (CN); Juan Chen, Shenzhen (CN); Teng Ma, Chengdu (CN); Hanguo Li, Munich (DE)

(72) Inventors: Xing Hu, Shenzhen (CN); Hongli Jiang, Chengdu (CN); Juan Chen, Shenzhen (CN); Teng Ma, Chengdu (CN); Hanguo Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 13/862,853

(22) Filed: Apr. 15, 2013

(65) Prior Publication Data
US 2013/0230326 A1      Sep. 5, 2013

Related U.S. Application Data

(63) Continuation of application No. PCT/CN2011/080700, filed on Oct. 12, 2011.

(30) Foreign Application Priority Data

Oct. 14, 2010   (CN) .......................... 2010 1 0507110

(51) Int. Cl.
*H04B 10/07*      (2013.01)
*H04Q 11/00*      (2006.01)
(Continued)

(52) U.S. Cl.
CPC .............. *H04B 10/07* (2013.01); *H04J 3/0682* (2013.01); *H04J 3/1652* (2013.01); *H04Q 11/0067* (2013.01); *H04Q 2011/009* (2013.01)

(58) Field of Classification Search
CPC ...................................................... H04J 3/1652
See application file for complete search history.

(56) References Cited

U.S. PATENT DOCUMENTS 6,490,264 B1 * 12/2002 Suzuki .......................... 370/338
8,249,458 B2 * 8/2012 Mizutani et al. .............. 398/100
(Continued)

FOREIGN PATENT DOCUMENTS

| CN | 1507207 A   | 6/2004 |
| -- | ----------- | ------ |
| CN | 101005322 A | 7/2007 |

(Continued)

OTHER PUBLICATIONS

Shami et al., "A New Dynamic Bandwidth Allocation Scheme in Ethernet Passive Optical Access Networks", Proceeding of the 2004 International Conference on Parallel Processing Workshops, IEEE (2004).

(Continued)

*Primary Examiner* — Nathan Curs
(74) *Attorney, Agent, or Firm* — Leydig, Voit & Mayer, Ltd.

(57) ABSTRACT

Embodiments of the present invention disclose a method and a system for realizing PON reach extension, and a relay apparatus for realizing this method. The method includes: extracting an overhead in an upstream data stream that is sent by an ONU to an OLT, obtaining a payload in the upstream data stream through de-mapping, and storing it into a buffer; extracting bandwidth authorization information in an downstream data stream that is sent by the OLT to the ONU; and reorganizing a stored payload according to the bandwidth authorization information and inserting a corresponding overhead to generate a new upstream data stream and send it to the OLT.

10 Claims, 6 Drawing Sheets

(51) Int. Cl.
*H04J 3/16* (2006.01)
*H04J 3/06* (2006.01)

(56) References Cited

U.S. PATENT DOCUMENTS

| | | | |
|---|---|---|---|
| 8,428,457 B2* | 4/2013 | Mizutani et al. | 398/25 |
| 2007/0172236 A1 | 7/2007 | Nomura et al. | |
| 2007/0286211 A1 | 12/2007 | Toyomura et al. | |
| 2009/0208210 A1* | 8/2009 | Trojer et al. | 398/58 |
| 2010/0189433 A1* | 7/2010 | Trojer | 398/8 |
| 2011/0038632 A1 | 2/2011 | Zou | |
| 2011/0085799 A1* | 4/2011 | Mizutani | 398/37 |
| 2012/0141139 A1* | 6/2012 | Bakhru et al. | 398/158 |
| 2012/0230678 A1* | 9/2012 | In De Betou et al. | 398/27 |

FOREIGN PATENT DOCUMENTS

| | | |
|---|---|---|
| CN | 101478701 A | 7/2009 |
| CN | 101572832 A | 11/2009 |
| CN | 102131131 A | 7/2011 |
| EP | 2207285 A1 | 7/2010 |
| WO | WO 2008117035 A1 | 10/2008 |
| WO | WO 2009086789 A1 | 7/2009 |

OTHER PUBLICATIONS

"Series G: Transmission Systems and Media Digital Systems and Networks; Digital Sections and Digital Line System—Optical Line Systems for Local and Access Networks; Gigabit-capable Passive Optical Networks (G-PON): ONT Management and Control Interface Specification," Feb. 2008, ITU-T, Geneva, Switzerland.

Saliou et al., "Reach Extension Strategies for Passive Optical Networks [Invited]," Sep. 2009, Optical Society of America, Washington, DC.

Chinese Search Report in corresponding Chinese Patent Application No. 2010105071109 (Nov. 28, 2012).

Written Opinion of the International Searching Authority in corresponding PCT Patent Application No. PCT/CN2011/080700 (Jan. 19, 2012).

International Search Report in corresponding PCT Patent Application No. PCT/CN2011/080700 (Jan. 19, 2012).

* cited by examiner

METHOD, SYSTEM, AND RELAY APPARATUS FOR REALIZING PASSIVE OPTICAL NETWORK REACH EXTENSION

CROSS-REFERENCE TO RELATED APPLICATIONS

This application is a continuation of International Patent Application No. PCT/CN2011/080700, filed on Oct. 12, 2011, which claims priority to Chinese Patent Application No. 201010507110.9, filed on Oct. 14, 2010, both of which are hereby incorporated by reference in their entireties.

FIELD OF THE INVENTION

The present invention relates to the field of network transmission, and in particular, to a method, a system, and a relay apparatus for realizing passive optical network reach extension.

BACKGROUND OF THE INVENTION

A passive optical network (Passive Optical Network, PON) technology is currently one of the most widely applied fiber to the home (Fiber To The Home, FTTH) technologies. Existing PONs include a broadband passive optical network (Broadband Passive Optical Network, BPON), a gigabit-capable passive optical network (Gigabit-capable Passive Optical Network, GPON), and an Ethernet passive optical network (Ethernet Passive Optical Network, EPON).

Figure 1:
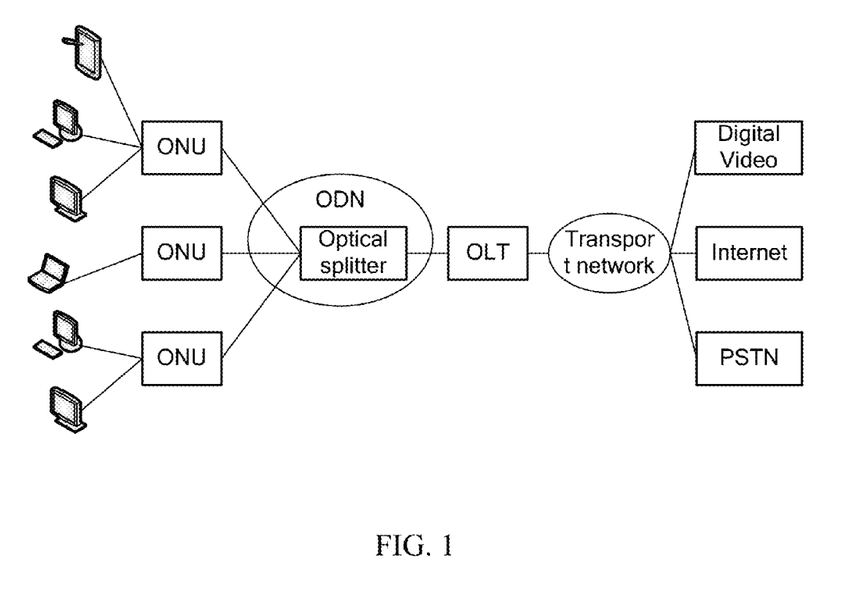
FIG. 1 is a schematic diagram of a networking architecture of using a traditional PON system for access.

What is shown in FIG. 1 is a diagram of a networking architecture of using a traditional PON system for access. The PON is used to connect a user terminal to a transport network, and then connect it through the transport network to a core network, that is, a digital video (Video) network, an Internet (Internet), and a public switched telephone network (Public Switched Telephone Network, PSTN).

The most basic components of a PON system include: an optical line terminal (Optical Line Terminal, OLT), an optical network unit (Optical Network Unit, ONU), and an optical distribution network (Optical Distribution Network, ODN), and so on. The OLT and a passive optical splitter are connected by a trunk fiber. The optical splitter realizes point-to-multi-point optical power distribution, and is connected to multiple ONUs through multiple branch fibers. The trunk fiber, the passive optical splitter, and the branch fibers are between the OLT and the ONU and are collectively called the ODN. A direction from the OLT to the ONU is called a downstream direction, and a direction from the ONU to the OLT is called an upstream direction.

A time division multiple address (Time Division Multiple Address, TDMA) multiplexing manner is adopted in the upstream direction, and each ONU sends an upstream data stream only at a timeslot that is specified by the OLT. In the downstream direction, a time division multiplexing (Time Division Multiplexing, TDM) broadcasting manner is adopted. The OLT sends a downstream data stream to each ONU, and uses a specific identity to indicate that which ONU each timeslot belongs to. Optical signals that carry downstream data streams of all ONUs are divided into several parts at the optical splitter of the ODN, and arrive at each ONU through each branch fiber. Each ONU collects the data that belongs to itself according to a corresponding identity, and discards data of other timeslots.

In the traditional PON system, the coverage of the OLT over the ONU does not exceed 20 km, and the quantity of ONUs that are connected through the optical splitter is relatively small. As a result, the quantity of OLTs in a traditional PON networking architecture is relatively large, location areas are scattered and remote, management and maintenance is very inconvenient, and device investment and maintenance cost are relatively high.

With the emergence of the next-generation optical access network, carriers demand extending the coverage of the PON, and therefore, a long reach PON (long reach PON, LR-PON) reach extension technology is brought forward. A reach extension solution of the PON system, where the reach extension solution is based on an optical transport network (Optical Transport Network, OTN) technology and a wavelength division multiplexing (Wavelength Division Multiplexing, WDM) technology, has advantages such as reducing fibers, easy to maintain and manage, and high reliability, thereby drawing wide attention and motivation from the industry. Especially, a reach extension solution of an OTN-based GPON system (GPON over OTN) is successfully brought into standards, and is adopted by multiple carriers.

Figure 2:
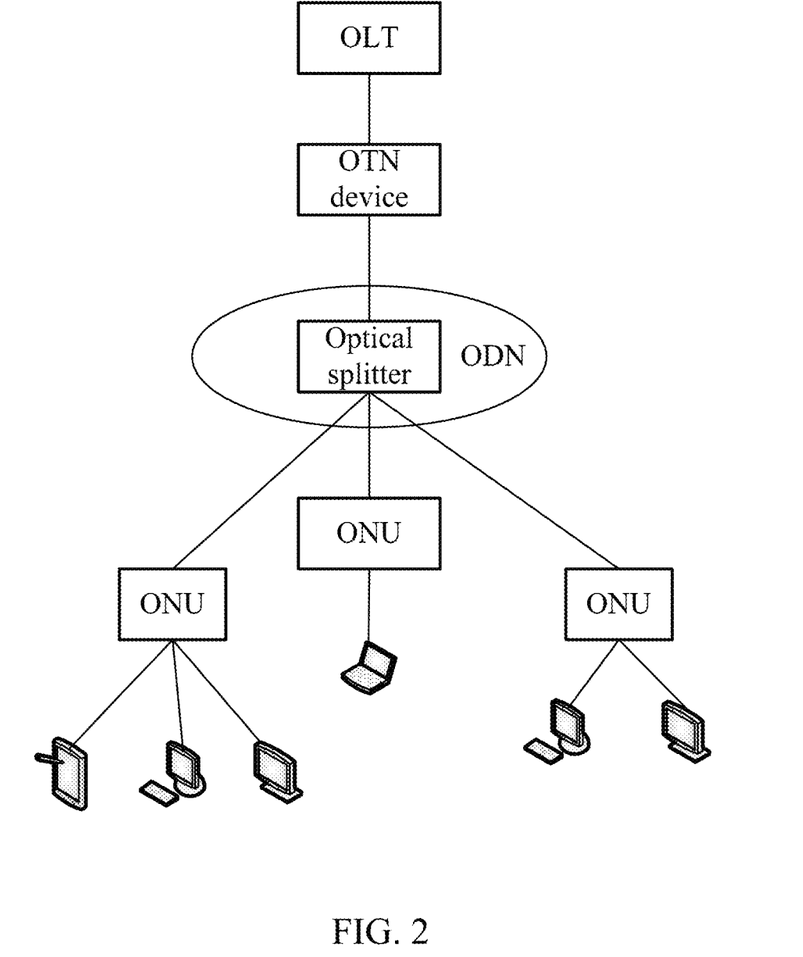
FIG. 2 is a schematic architecture diagram of an existing OTN-based GPON reach extension system.

What is shown in FIG. 2 is a schematic architecture diagram of an OTN-based GPON reach extension system. An OTN device is added between the OLT and the optical splitter of the ODN, and the wavelength division multiplexing (Wavelength Division Multiplexing, WDM) technology is used to realize bidirectional data transmission. The OTN device transparently maps (bit mapping) upstream and downstream data frames of the GPON to OTU-k frames, transmits them through an OTN network to a remote device, and then obtains original GPON upstream and downstream data frames through de-mapping, thereby realizing reach extension of the GPON system.

It is supposed that the waiting time from the time when the OLT starts to send the downstream data stream to the time when the upstream data stream that is sent by the ONUs is received is T. Then, a maximum value of the waiting time T that can be tolerated by the OLT is converted into the kilometers of the fiber, that is, a maximum logical distance which is of the OLT and which is defined by a protocol. For example, the maximum logical distance which is of the OLT and which is defined by a current GPON standard is 60 km. In an existing PON reach extension solution, an extension distance is limited by the maximum logical distance which is of the OLT and which is defined by the protocol. If the PON system is extended to exceed the maximum logical distance that is specified by the protocol, the OLT cannot receive the upstream data stream that is sent by the ONUs in the foregoing specified time T, thereby causing that the OLT cannot receive the upstream data stream normally.

SUMMARY OF THE INVENTION

Embodiments of the present invention provide a method, a system, and a relay apparatus for realizing PON reach extension, so that PON long reach extension is realized in a case that any existing PON protocols and OLT device do not change.

A method for realizing passive optical network reach extension includes: extracting an overhead in an upstream data stream that is sent by an ONU to an OLT, obtaining a payload in the upstream data stream through de-mapping, and storing it into a buffer; extracting bandwidth authorization information in a downstream data stream that is sent by the OLT to the ONU; and reorganizing the stored payload according to the bandwidth authorization information and inserting a corresponding overhead to generate a new upstream data stream and send it to the OLT.

A system for realizing passive optical network reach extension includes an OLT, a relay apparatus, and at least one ONU. The OLT sends a downstream data stream that includes bandwidth authorization information through the relay apparatus to the ONU. The ONU acquires the bandwidth authorization information from the downstream data stream, and sends an upstream data stream according to the bandwidth authorization information. The relay apparatus extracts an overhead in the upstream data stream that is sent by the ONU to the OLT, obtains a payload in the upstream data stream through de-mapping, and stores it; extracts the bandwidth authorization information in the downstream data stream that is sent by the OLT to the ONU; and reorganizes the stored payload according to the stored bandwidth authorization information and inserts the corresponding overhead to generate a new upstream data stream and send it to the OLT.

A relay apparatus for realizing passive optical network reach extension includes: a processing module, an overhead extracting module, a decapsulating module, a buffer, a data stream regenerating module, a sending module, a receiving module, and a bandwidth map extracting module. The receiving module receives a downstream data stream that is sent by an OLT to an ONU. The bandwidth map extracting module extracts bandwidth authorization information from the downstream data stream. The overhead extracting module extracts an overhead from an upstream data stream that is sent by the ONU to the OLT, and sends it to the processing module to store it into the buffer. The decapsulating module obtains a payload through de-mapping from the upstream data stream whose overhead is extracted, and sends it to the processing module to store it into the buffer. The data stream regenerating module reorganizes the payload that is stored in the buffer according to the bandwidth authorization information, inserts the corresponding overhead to generate a new upstream data stream, and sends it to the OLT through the sending module.

In embodiments of the present invention, the relay apparatus is added to an existing PON reach extension system to relay the upstream data stream that is sent by the ONU to the OLT, thereby breaking a restriction on a maximum logical distance which is of the OLT and which is defined by the PON protocol, and realizing the PON reach extension of a longer distance in the case that any existing PON protocols and OLT device do not change.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons skilled in the art may still derive other drawings based on these accompanying drawings without creative efforts.

DETAILED DESCRIPTION OF THE EMBODIMENTS

To facilitate understanding and realization of the present invention by persons skilled in the art, the embodiments of the present invention is described with reference to accompanying drawings. The schematic embodiments and the related descriptions of the present invention are used to illustrate the present invention but are not intended to limit the present invention.

Figure 3:
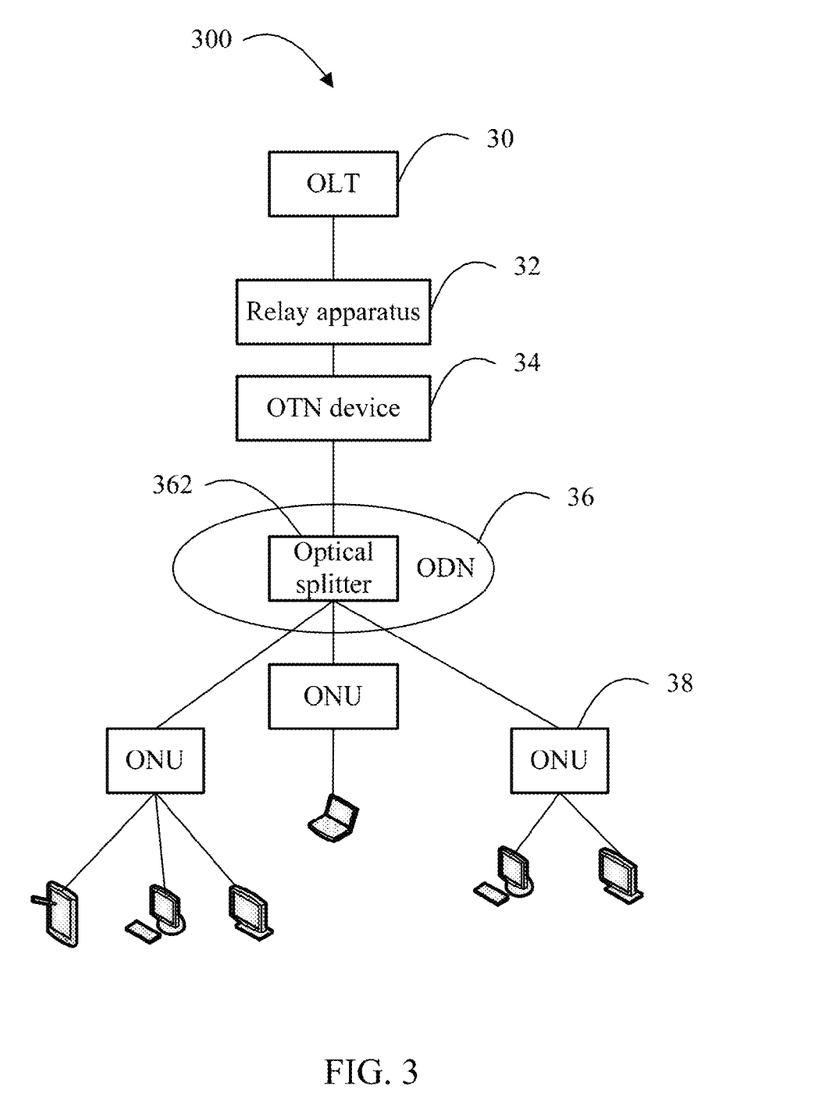
FIG. 3 is a schematic architecture diagram of a PON reach extension system according to an embodiment of the present invention, where a relay apparatus is added between an OLT and an ODN.

The technical solutions of the present invention are described in the following with reference to the accompanying drawings and embodiments. What is shown in FIG. 3 is a schematic architecture diagram of a PON reach extension system 300 according to an embodiment of the present invention. The PON reach extension system 300 includes an optical line terminal (OLT) 30, a relay apparatus 32, an OTN device 34, an optical distribution network (ODN) 36, and multiple optical network units (ONU) 38. A trunk fiber, an optical splitter 362, and branch fibers are between the OLT 30 and the multiple ONUs 38 and form the ODN 36. The OTN device 34 includes optical fibers and a router that form an optical transport network.

The relay apparatus 32 is located between the OLT 30 and the optical splitter 362 of the ODN 36, and processes data streams that are transmitted between the OLT 30 and the ONUs 38, so that the PON reach extension system 300 realizes the long distance extension function that exceeds a maximum logical distance which is defined by a PON protocol without changing the existing PON protocols and OLT device.

The OTN device 34 adopts a WDM technology to transmit data streams that are received and sent between the OLT 30 and the multiple ONUs 38, and adopts an electrical relay manner of optical-electrical-optical conversion to realize long reach extension of a PON.

The relay apparatus 32 works with the OLT 30 to activate the ONUs 38, specifically including: completing registration of one of the ONUs 38; forwarding a distance measuring request that is sent by the OLT 30 to the ONU 38; receiving a distance measuring response message that is returned by the ONU 38 and is as a response to the distance measuring request, and deducting a delay of transmitting the distance measuring response message in the OTN device 34 from the time of receiving the distance measuring response message to generate a new distance measuring response message and send it to the OLT 30; forwarding, to the ONU 38, an equalization delay value Td that is calculated by the OLT 30 according to the arrival time of the distance measuring response message; and forwarding a reply message (Ploam_ACK) that is returned by the ONU 38 to the OLT 30 after the ONU 38 receives the equalization delay value Td, indicating that the ONU 38 receives the equalization delay value Td, thereby activating the ONU 38.

When a payload that is of a certain ONU and that is stored in the relay apparatus 32 is empty, an upstream data stream where an idle frame is inserted into a payload area is generated, and is sent to the OLT 30 when the data sending time that is specified by the OLT 30 arrives.

The delay of transmitting the distance measuring response message in the OTN device 34 may be obtained through test after the OTN device 34 is constructed, and its value mainly depends on lengths and characteristics of the fibers in the OTN device 34.

Steps of completing registration of any one ONU 38 are specifically: extracting bandwidth authorization information in a downstream data stream that is sent by the OLT to the ONU; forwarding a sequence number (Sequence Number, SN) request that is regularly sent by the OLT 30 to each ONU 38; buffering a sequence number that is returned by one of the ONUs 38 to the OLT 30 as a response to the sequence number request, and when receiving again the sequence number request that is sent by the OLT 30, according to the bandwidth authorization information, sending the sequence number to the OLT 30; and forwarding an identifier that is allocated by the OLT 30 for the ONU 38, thereby completing registration of the ONU.

After the ONU 38 is activated, the relay apparatus 32 forwards the downstream data stream that is sent by the OLT 30 to the ONU 38, and extracts and buffers upstream bandwidth authorization information (also called a bandwidth map) that is sent by the OLT 30. The upstream bandwidth authorization information is used to indicate start time and end time of sending upstream data streams by the multiple ONUs 38, or indicate start time and duration of sending the upstream data streams by the multiple ONUs 38, and ensure that timeslots for sending the upstream data streams by the multiple ONUs 38 do not overlap, that is, so that the multiple ONUs 38 share the same transmission channel through time division multiplexing.

The relay apparatus 32 further extracts an overhead from the upstream data stream that is transmitted by each ONU 38, obtains the payload of each ONU through de-mapping from the upstream data stream whose overhead is extracted, and performs buffering respectively.

The relay apparatus 32 further reorganizes the payload of each ONU according to the newest bandwidth authorization information that is sent by the OLT 30, inserts a corresponding overhead to generate a new upstream data stream, and sends it upstream to the OLT 30 when the data sending time that is specified by the OLT 30 arrives.

The technical solutions of the present invention may be applied to PON systems that are under protocols such as a GPON, an EPON, and a BPON. In different PON protocols, the data stream may be in a data format such as a frame and a packet, and the data stream includes data of any format such as voice, video, and multimedia content.

In the technical solutions of the present invention, the relay apparatus 32 is added to the existing PON reach extension system 300, so that a restriction on the maximum logical distance which is of the OLT 30 and which is defined in the PON protocol is broken, and PON extension of a longer reach is realized without changing any existing PON protocols and OLT device.

Figure 4:
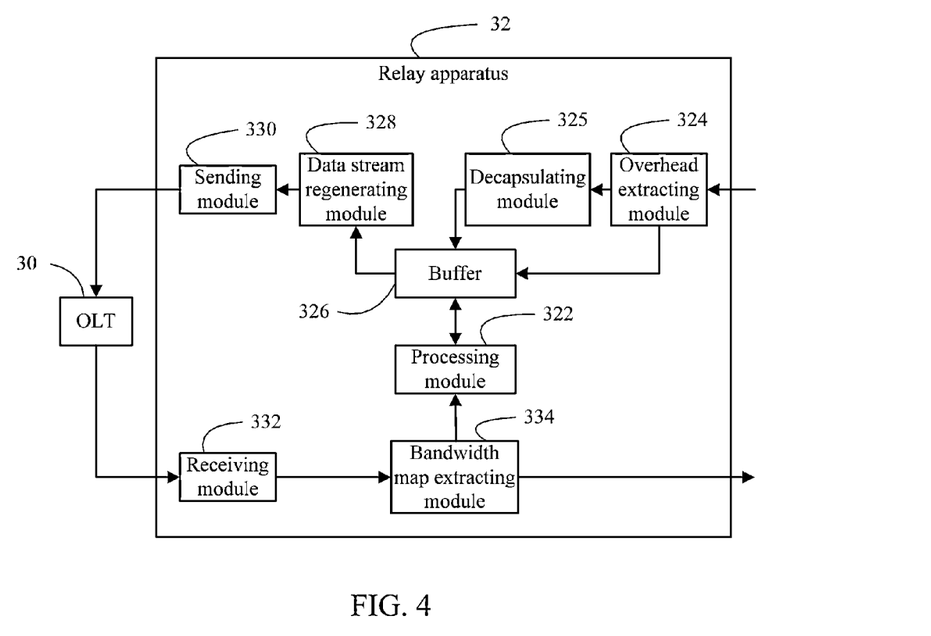
FIG. 4 is a functional block diagram of the relay apparatus in FIG. 3.

What is shown in FIG. 4 is a functional block diagram of the relay apparatus 32 in FIG. 3. The relay apparatus 32 includes a processing module 322, an overhead extracting module 324, a decapsulating module 325, a buffer 326, a data stream regenerating module 328, a sending module 330, a receiving module 332, and a bandwidth map extracting module 334.

During a process of activating an ONU:

The bandwidth map extracting module 334 extracts bandwidth authorization information in a downstream data stream that is sent by an OLT 30 to an ONU 38, and sends it to the processing module 322 to store it into the buffer 326.

The processing module 322 stores into the buffer 326 a sequence number that is returned by one of ONUs 38 to the OLT 30 as a response to a sequence number request which is sent by the OLT 30, and when receiving again the sequence number request that is sent by the OLT 30, according to the bandwidth authorization information, sends the sequence number to the OLT 30.

The processing module 322 further receives a distance measuring response message that is returned by the ONU 38 as a response to a distance measuring request, deducts a delay of transmitting the distance measuring response message in an OTN device from the time of receiving the distance measuring response message to generate a new distance measuring response message, and when receiving again the distance measuring request that is sent by the OLT, sends the new distance measuring response message to the OLT.

In an upstream data transmission direction (that is, data is transmitted from the ONU 38 to the OLT 30):

The extracting module 324 extracts an overhead from an upstream data stream that is sent by each ONU, and sends it to the processing module 322 to store it into the buffer 326. The overhead includes overhead information of one or multiple types among a minimum physical layer overload (Physical Layer Overload upstream, PLOu), upstream physical layer OAM (Physical Layer OAM upstream, PLOAMu), an upstream power leveling sequence (Power Levelling Sequence upstream, PLSu), and an upstream dynamic bandwidth request (Dynamic Bandwidth Report upstream, DBRu).

The decapsulating module 325 obtains a payload through de-mapping from the upstream data stream whose overhead is extracted, and sends it to the processing module 322 to store it into the buffer 326.

The data stream regenerating module 328 reorganizes the payload that is stored in the buffer 326 according to newest bandwidth authorization information that is sent by the OLT 30, inserts a corresponding overhead to generate a new upstream data stream, and sends it to the OLT 30 through the sending module 330 when the data sending time that is specified by the OLT 30 arrives. When the payload that is of any ONU and that is stored in the buffer 326 is empty, the data stream regenerating module 328 generates an upstream data stream where an idle frame is inserted into a payload area, and sends it to the OLT 30 when the data sending time that is specified by the OLT 30 arrives.

The buffer 326 is configured to store the bandwidth authorization information that is sent by the OLT 30, and the overhead and the payload which are sent by each ONU, and reports a state of the stored payload of each ONU to the processing module 322. The state of the payload of each ONU includes the number of bytes of the payload of the ONU.

In a downstream data transmission direction (that is, data is transmitted from the OLT 30 to each ONU 38):

The receiving module 332 receives the downstream data stream that is sent by the OLT 30, and sends the downstream data stream to the bandwidth map extracting module 334.

The bandwidth map extracting module 334 extracts from the downstream data stream the bandwidth authorization information that is sent by the OLT 30, and sends it to the processing module 322 to store it into the buffer 326.

The relay apparatus 32 in the embodiment of the present invention reorganizes the upstream data stream that is sent by the ONU 38 to the OLT 30, so that a restriction on a maximum logical distance which is of the OLT 30 and which is defined by a PON protocol is broken, and PON extension of a longer reach is realized without changing any existing PON protocols and OLT device.

Figure 5:
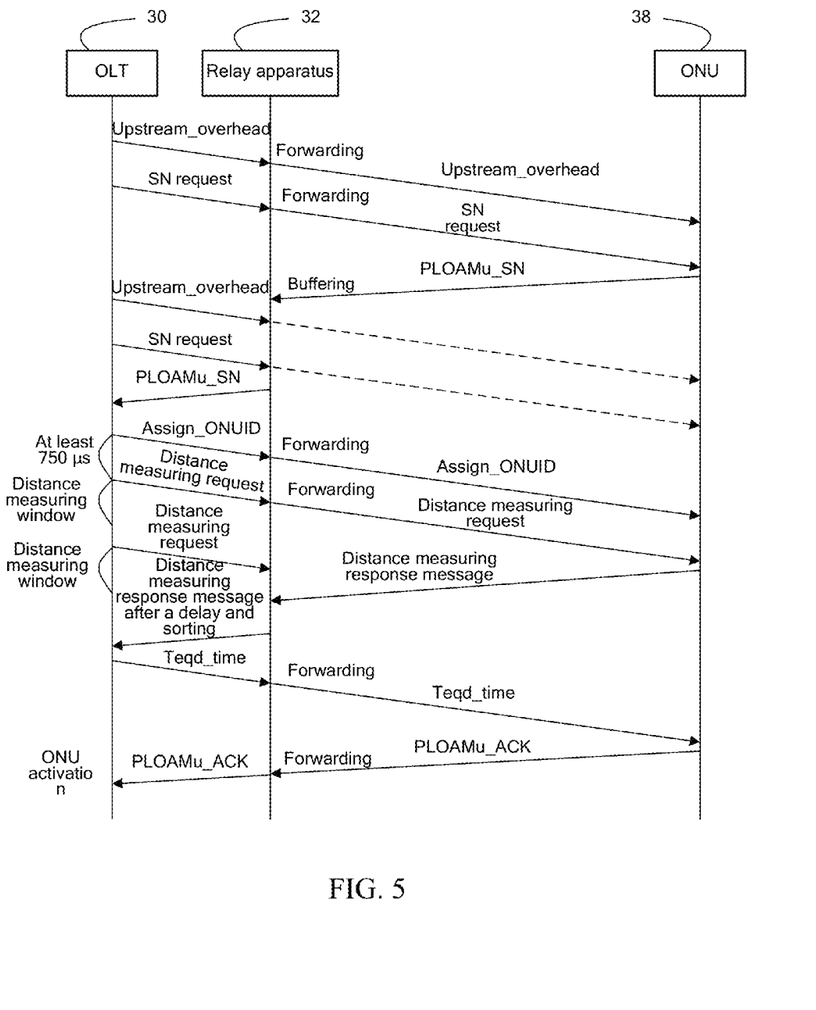
FIG. 5 is an operational flow chart of the relay apparatus during an ONU activation process in FIG. 3.

What is shown in FIG. 5 is an operational flow chart of the relay apparatus 32 during an ONU activation process in FIG.

3. The operation flow is described in the following by taking the ONU activation process in a GPON protocol as an example.

Extract the bandwidth authorization information in the downstream data stream that is sent by the OLT 30 to the ONU 38, and store it.

Forward an downstream overhead (downstream overhead) and a sequence number request that are regularly sent by the OLT 30 to each ONU 38, where the downstream overhead specifies configuration parameters of each ONU 38 such as transmitting optical power, the number of bytes for a preamble, and a pre-allocated equalization delay value Td.

When one of the ONUs 38 receives the downstream overhead and the sequence number request, the ONU 38 sends a sequence number of the ONU 38 to the OLT 30 according to the configuration parameters in the downstream overhead. The ONU 38 may be an ONU that newly joins a GPON system or an ONU that is powered on again. In the GPON system, the ONU 38 transmits its sequence number through a PLOAM field in an upstream data frame, and PlOAMu_SN is used to indicate the sequence number that is transmitted in the PLOAM field.

A response time period T1 for the OLT 30 upon reception of the sequence number of the ONU 38 is designed according to the maximum logical distance (for example, 60 km in the GPON protocol) which is between the OLT 30 and the ONU 38 and which is defined by the PON protocol. Therefore, when an actual distance (for example, 100 KM) between the OLT 30 and the ONU 38 exceeds the maximum logical distance, the OLT 30 cannot receive the sequence number that is returned by the ONU 38 within the response time period T1.

Therefore, the relay apparatus 32 extracts the sequence number of the ONU 38 from the PLOAM field in the upstream data frame, and stores it.

When receiving again the sequence number request that is sent by the OLT 30, the relay apparatus 32 inserts the stored sequence number of the ONU 38 into the PLOAM field of the upstream data frame, and according to the stored bandwidth authorization information, sends to the OLT 30 the upstream data frame where the sequence number is inserted.

When receiving a new sequence number, the OLT 30 judges the sequence number. If the sequence number is legal, it is determined that a new ONU 38 request is activated. Then the OLT 30 allocates an identifier (Assign_ONUID) for the ONU 38, inserts the identifier into an overhead field of a downstream data frame, and sends it to the relay apparatus 32. The relay apparatus forwards the downstream data frame that includes the identifier to a corresponding ONU 38.

The OLT 30 starts to measure a distance for the ONU 38 within a preset time period T2 after the identifier is allocated for the ONU 38. In the GPON system, the preset time period T2 is at least 750 μs because data receiving and sending of the running ONU 38 need to be interrupted during a distance measuring period. The ONU 38 needs to buffer the received data within this period, and in order to avoid overflow of the data that is received by the ONU 38, the ONU 38 may send a part of data to the OLT 30 within the preset time period T2.

The OLT 30 forwards a distance measuring request to the ONU 38 through the relay apparatus 32. After receiving the distance measuring request, the ONU 38 returns a distance measuring response message to the OLT 30.

A distance measuring window T3 (that is, a preset time period T3) of the OLT 30 is designed according to the maximum logical distance (that is, 60 km) which is between the OLT 30 and the ONU 38 and which is defined by the GPON protocol. Therefore, when the actual distance between the OLT 30 and the ONU 38 exceeds 60 km, the OLT 30 cannot receive the distance measuring response message within the distance measuring window T3.

When the OLT 30 does not receive the distance measuring response message within a distance measuring window T3, the OLT 30 considers that distance measuring fails, waits for at least one preset time period T2, and then sends a distance measuring request to the ONU 38 again. If within the distance measuring window T3, the distance measuring response message that is returned by the ONU 38 still cannot be received, the OLT 30 considers that the ONU 38 is invalid, and deletes the identifier of the ONU.

Therefore, the relay apparatus 32 extracts the distance measuring response message in the upstream data frame that is sent by the ONU 38, deducts a delay of transmitting the upstream data frame in an OTN device 34 from the time of receiving the upstream data frame upstream to generate a new distance measuring response message, and when the relay apparatus 32 extracts again the distance measuring request from the downstream data frame that is sent by the OLT 30, sends the new distance measuring response message to the OLT 30.

The OLT 30 calculates loop delay time (called equalized loop delay value Teqd) of the ONU 38 according to arrival time of the distance measuring response message, and calculates equalization delay value Td of the ONU 38 according to the loop delay time Teqd, so that the loop delay time Teqd of each ONU 38 after respective equalization delay value Td is inserted is the same. The loop delay time Teqd indicates the time required by a signal from the time when it is sent by the OLT 30 to the ONU 38 to the time when it is returned to the OLT 30, and also includes the time of processing the signal by the ONU 38.

The relay apparatus 32 forwards the equalization delay value Td to the ONU 38. After receiving the equalization delay value Td, the ONU 38 returns a reply message (Ploam_ACK) to the OLT 30 to indicate that it receives the equalization delay value Td.

After the OLT 30 extracts the reply message that is returned by the ONU 38 from the upstream data frame that is forwarded by the relay apparatus 32, distance measuring is completed, and the ONU 38 is activated. After the ONU 38 is activated, the OLT 30 performs normal receiving and sending of the data with the ONU 38 through the relay apparatus 32.

Figure 6:
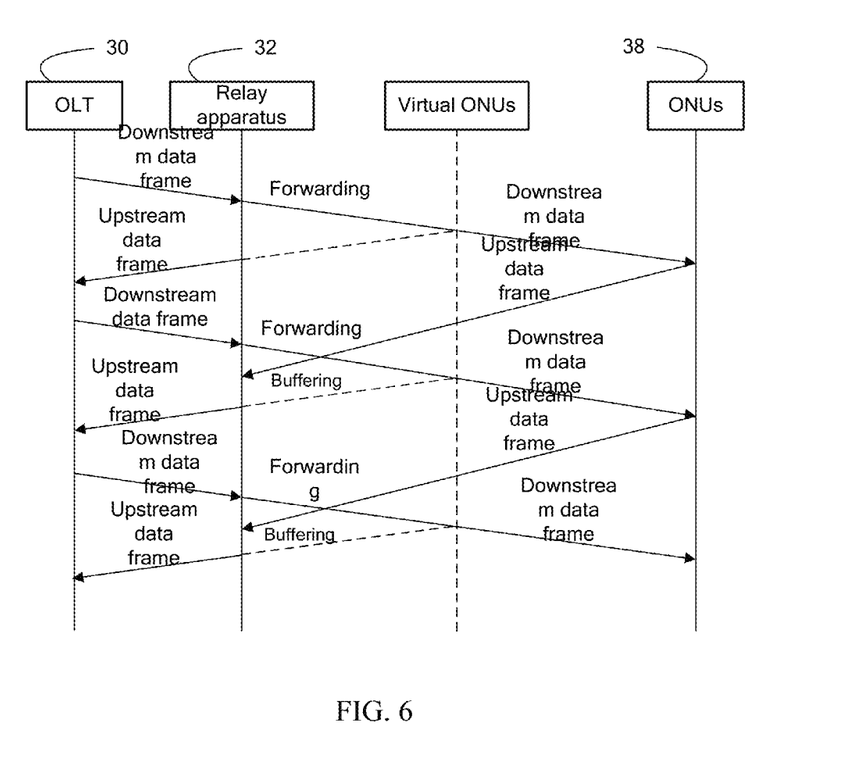
FIG. 6 is a flow chart of data receiving and sending between the OLT and an ONU in FIG. 3.

What is shown in FIG. 6 is a flow chart of data receiving and sending between the OLT 30 and the ONU 38 in FIG. 3. According to specification of the GPON protocol, when the OLT 30 sends a new bandwidth map to the ONU 38, the ONU 38 must send an upstream data frame to the OLT 30 according to the new bandwidth map when a data sending time period T4 that is specified by the protocol ends. In the GPON protocol, the data sending time period T4 is 125 μs.

The data sending time period T4 is designed according to the maximum logical distance (that is, 60 km) which is between the OLT 30 and the ONU 38 and which is defined by the GPON protocol. Therefore, when the actual distance between the OLT 30 and the ONU 38 exceeds 60 km, within the data sending time period T4, the OLT 30 cannot receive the upstream data frame that is sent according to the new bandwidth map by the ONU 38. At this time, the OLT 30 considers that the ONU 38 is offline, thereby interrupting the data receiving and sending with the ONU 38.

Therefore, when forwarding the downstream data frame that is sent by the OLT 30, the relay apparatus 32 extracts the bandwidth map from the downstream data frame, and stores it.

The OLT 30 may allocate one or multiple transmission containers (Transmission Container, T-CONT) for each ONU 38. The transmission container is used to receive and send data frames, and an Alloc_ID is used for identification. The relay apparatus 32 further extracts the overhead from the upstream data frame of each T-CONT, obtains the payload through de-mapping from the upstream data frame whose overhead is extracted, and stores them respectively. The overhead includes overhead information of one or multiple types among PLOu, PLOAMu, PLSu, and DBRu.

When the data sending time period T4 that is specified by the protocol arrives, the relay apparatus 32 reorganizes a buffered payload of each T-CONT according to the newest bandwidth map that is sent by the OLT 30, and inserts the corresponding overhead to generate a new upstream data frame and send it to the OLT 30.

When the payload which is of any T-CONT and which is stored in the relay apparatus 32 is empty, an upstream data stream where an idle frame is inserted into a payload area is generated, and is sent to the OLT 30 when the data sending time period T4 that is specified by the OLT 30 ends.

Before the data sending time period T4 that is specified by the GPON protocol ends, the relay apparatus 32 further calculates a new bandwidth requirement according to a current size of each T-CONT buffer area and bandwidth requirement that is in the DBRu, and updates the new bandwidth requirement in the DBRu. The reason for calculating the new bandwidth requirement is that the bandwidth requirement which is of each T-CONT and which is received by the relay apparatus 32 cannot reflect the current size of each T-CONT buffer area in the relay apparatus 32. To avoid overflow of any T-CONT buffer area in the relay apparatus 32, the bandwidth requirement in the DBRu needs to be recalculated according to the size of each T-CONT buffer area in the relay apparatus 32. For example, a maximum value among the size of the T-CONT buffer area in the relay apparatus 32 and the bandwidth requirement in the DBRu is taken as the new bandwidth requirement. The OLT 30 generates bandwidth authorization information according to the new bandwidth requirement.

The foregoing descriptions are only exemplary and specific embodiments of the present invention, but are not intended to limit the protection scope of the present invention. Any change or replacement that may be easily thought of by persons skilled in the art within the technical scope disclosed by the present invention should fall within the protection scope of the present invention. Therefore, the protection scope of the present invention should be subject to the protection scope of the claims.

What is claimed is:

1. A method for realizing passive optical network reach extension, wherein the method is implemented by a relay apparatus which is located between an optical line terminal (OLT) and an optical splitter of an optical distribution network, comprising:
   extracting, by the relay apparatus first bandwidth authorization information in a first downstream data stream that is sent by the OLT to an optical network unit (ONU);
   forwarding, by the relay apparatus, a sequence number request that is regularly sent by the OLT to the ONU;
   buffering, by the relay apparatus a sequence number that is returned by the ONU as a response to the sequence number request, and when receiving again the sequence number request that is sent by the OLT, sending the sequence number according to the first bandwidth authorization information to the OLT; and
   forwarding, by the relay apparatus, an identifier that is allocated by the OLT to the ONU;
   extracting, by the relay apparatus, an overhead in an upstream data stream that is sent by the ONU to the OLT, obtaining data carried in a payload in the upstream data stream through de-mapping, and storing the obtained data into a buffer;
   extracting, by the relay apparatus, second bandwidth authorization information in a second downstream data stream that is sent by the OLT to the ONU;
   generating a new upstream data stream according to the bandwidth authorization information, by the relay apparatus, wherein the new upstream data stream comprises at least part of the obtained data in the buffer and a corresponding overhead; and
   sending, by the relay apparatus, the new upstream data stream to the OLT.

2. The method according to claim 1, wherein after the forwarding the identifier that is allocated by the OLT for the ONU, the method further comprises:
   forwarding a distance measuring request that is sent by the OLT to the ONU;
   receiving a distance measuring response message that is returned by the ONU as a response to the distance measuring request;
   deducting a delay of transmitting the distance measuring response message in an OTN device from time of receiving the distance measuring response message to generate a new distance measuring response message and send the new distance measuring response message to the OLT;
   forwarding, to the ONU, an equalization delay value that is calculated by the OLT according to arrival time of the distance measuring response message; and
   forwarding a reply message that is returned by the ONU to the OLT after the ONU receives the equalization delay value, thereby activating the ONU.

3. The method according to claim 1, wherein:
   data of the ONU is transmitted through at least one T-CONT; and
   the method further comprising: in the buffer, allocating a T-CONT buffer area for each T-CONT of the ONU, calculating a new bandwidth requirement according to a size of the T-CONT buffer area and a bandwidth requirement, and inserting the new bandwidth requirement into the corresponding overhead.

4. The method according to claim 3, wherein the calculating the new bandwidth requirement is taking a maximum value among the size of the T-CONT buffer area and the bandwidth requirement in the corresponding overhead as the new bandwidth requirement.

5. A relay apparatus for realizing passive optical network reach extension, wherein the relay apparatus comprises: a processing module, an overhead extracting module, a decapsulating module, a buffer, a data stream regenerating module, a sending module, a receiving module, and a bandwidth map extracting module;
   wherein:
   the receiving module is configured to receive a downstream data stream that is sent by an optical line terminal (OLT) to an optical network unit (ONU);
   the bandwidth map extracting module is configured to extract first bandwidth authorization information from the downstream data stream;
   the overhead extracting module is configured to extract an overhead from an upstream data stream that is sent by the ONU to the OLT, and send the extracted overhead to the processing module to store the extracted overhead into the buffer;
   the decapsulating module is configured to obtain data carried in a payload through de-mapping from the upstream data stream whose overhead is extracted, and sends the obtained data to the processing module to store the obtained data into the buffer; and the data stream regenerating module is configured to generate a new upstream data stream according to the first bandwidth authorization information, wherein the new upstream data stream comprises at least part of stored data in the buffer and a corresponding overhead; and the sending module is configured to send the new upstream data stream to the OLT.

6. The relay apparatus according to claim 5, wherein the processing module further executes the following steps:

extracting a second bandwidth authorization information in the downstream data stream that is sent by the OLT to the ONU;

forwarding a sequence number request that is regularly sent by the OLT to the ONU;

buffering a sequence number that is returned by the ONU as a response to the sequence number request, and when receiving again the sequence number request that is sent by the OLT, sending the sequence number according to the second bandwidth authorization information to the OLT; and forwarding an identifier that is allocated by the OLT for the ONU.

7. The relay apparatus according to claim 6, wherein the processing module further executes the following steps:

forwarding a distance measuring request that is sent by the OLT to the ONU;

receiving a distance measuring response message that is returned by the ONU as a response to the distance measuring request;

deducting a delay of transmitting the distance measuring response message in an OTN device from time of receiving the distance measuring response message to generate a new distance measuring response message and send the new distance measuring response message to the OLT;

forwarding, to the ONU, an equalization delay value that is calculated by the OLT according to arrival time of the distance measuring response message; and forwarding a reply message that is returned by the ONU to the OLT after the ONU receives the equalization delay value, thereby activating the ONU.

8. The relay apparatus according to claim 5, wherein:

data of the ONU is transmitted through at least one T-CONT; and the processing module further allocates a T-CONT buffer area for each T-CONT of the ONU in the buffer, calculates a new bandwidth requirement according to a size of the T-CONT buffer area and a bandwidth requirement, and inserts the new bandwidth requirement into the corresponding overhead.

9. The relay apparatus according to claim 8, wherein, the processing module calculates the new bandwidth requirement by taking a maximum value among the size of the T-CONT buffer area and the bandwidth requirement in the overhead as the new bandwidth requirement.

10. A system for realizing passive optical network reach extension, wherein the system comprises an optical line terminal (OLT), at least one optical network unit (ONU), and a relay apparatus according to claim 5.

* * * * *